UNITED STATES PATENT OFFICE.

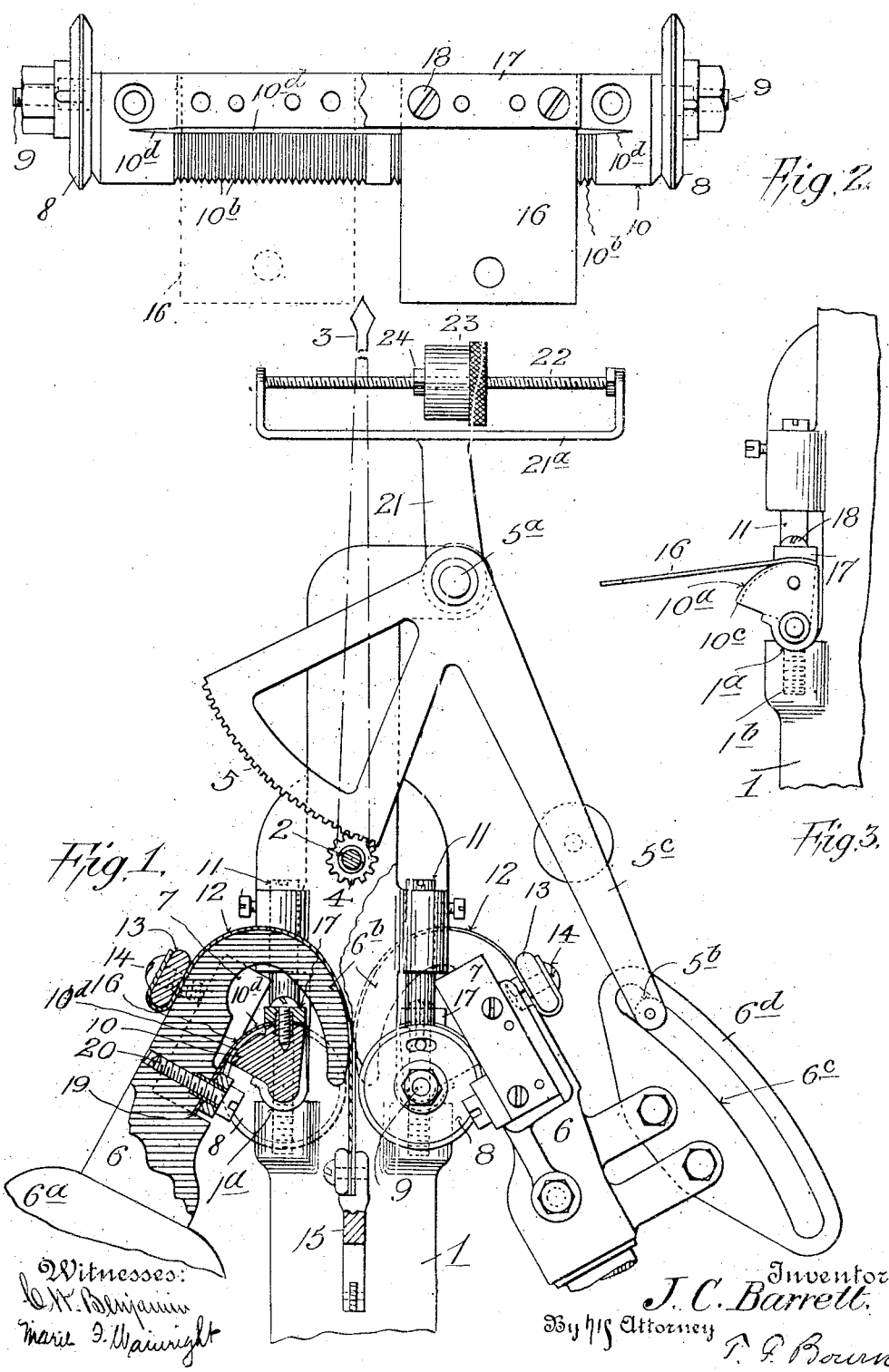

JOSEPH C. BARRETT, OF NEW YORK, N. Y., ASSIGNOR TO AMERICAN KRON SCALE COMPANY, OF NEW YORK, N. Y., A CORPORATION OF NEW YORK.

WEIGHING-SCALE.

1,086,345.   Specification of Letters Patent.   Patented Feb. 10, 1914.

Application filed May 4, 1912. Serial No. 695,102.

*To all whom it may concern:*

Be it known that I, JOSEPH C. BARRETT, a citizen of the United States, and resident of New York city, borough of Brooklyn, in the county of Kings and State of New York, have invented certain new and useful Improvements in Weighing-Scales, of which the following is a specification.

In weighing scales employing flexible strips or bands depending from fulcrum blocks to movably support the weights, scale beams and the like, from which latter motion is transmitted to an index member, or pointer, particles of dirt, chips and analogous foreign substances that may collect between the fulcrum block and the strip or band are liable to cause a variation in the normal operation of the index or pointer, or in other words, to cause the index or pointer to indicate or register the weight inaccurately at one or more of its positions, determined by the point of interposition of such foreign substances between the strip and the fulcrum block.

The object of my invention is to provide simple and efficient means for preventing or obviating the aforesaid variations of the index or pointer, and to this end I provide the fulcrum block or strip support, at the part beneath the strip, with recesses or grooves upon the edges of which the aforesaid strip or band rests, and by preference the upper portions of said recesses or grooves open into a transversely disposed recess or groove in the fulcrum block which is also beneath the flexible strip, the ends of which transverse recess or groove preferably open freely beyond the side edges of the flexible strip, and by preference the edges of the metal between the first named recesses are made sharp. By this means, if dust, chips and other like relatively small foreign substances or particles lodge upon the fulcrum block beneath such flexible strip, such foreign substances will fall into the recesses of the fulcrum block, or be forced therein by the flexible strip, or will be cut by the latter at the sharp edges of such recesses, thereby permitting the flexible strip to at all times bear properly upon the fulcrum block and obviate or prevent the unequal resting of the flexible strip upon the fulcrum block, (which would occur with the fulcrum blocks, as known to me, having a smooth bearing surface for the flexible strip), whereby the danger of inaccurate registering or indicating is overcome.

In the class of weighing machines referred to, wherein the index or pointer is rotated by means of rack and pinion devices operated by the movement of the balance weight or arm, (which is supported for rocking by the aforesaid flexible strip), it is sometimes customary to provide the weight or its supporting arm with a cam that coacts with an arm connected with the rack, whereby when the weight swings, under the influence of the article being weighed, the rack is operated to cause the proper rotation of the index or pointer. The surface of such cam, therefore, that coacts with the arm extending from the rack, must be very accurately fitted in connection with said arm, to cause the proper operation of the pointer at all points of its rotation, and slight variations in the cam surface or slight variations of the pressure of the rack-arm upon such cam are liable to cause undesirable variations in the action of the index or pointer.

An object of my invention is to provide means for regulating the action of the rack arm in connection with such cam, as, for instance, to balance or control the pressure or weight of the rack-arm upon the cam in varying positions of the latter with respect to said arm. To this end I connect with the rack an adjustable counterpoise or weight, having proper relation to the rack and its arm that coacts with the cams, whereby, by adjusting said counterpoise or weight with respect to the pivotal support of the rack and its arm, the pressure or weight of the latter upon the cam may be regulated in such manner as to overcome variable movement of the index or pointer by the cam and rack that might otherwise occur.

My invention also comprises novel details of improvement and combinations of parts that will be more fully hereinafter set forth and then pointed out in the claims.

Reference is to be had to the accompanying drawings forming part hereof, wherein.

Figure 1 is an elevation, partly in section, of a weighing-scale index or pointer-operating mechanism embodying my invention; Fig. 2 is a plan view of the fulcrum block or support for the flexible strip that supports the balance weight, and Fig. 3 is a detail end view of the fulcrum bar in its support.

The numeral 1 indicates a portion of the frame of a weighing scale mechanism which may be of suitable construction. 2 indicates a shaft carrying a pointer 3, and 4 a pinion meshing with a rack 5 pivotally supported at 5ª upon frame 1, all of any well-known or desired construction. The arm 6, which may be weighted or provided with desired weights 6ª, is provided at opposite sides with bearing blocks 7 adapted to roll upon rollers 8 that are journaled upon pivots 9 at opposite ends of fulcrum block 10. One of the arms 6 has a cam 6ᶜ to co-act with a roller 5ᵇ pivoted on the arm 5ᶜ of rack 5. The fulcrum block 10 is supported in frame 1 in any suitable manner, as by resting in suitable seats 1ª in said frame and retained firmly in position by screws 11 passing through the fulcrum block and meshing in threads in suitable recesses 1ᵇ in frame 1. The arms 6 are shown provided with curved end portions 6ᵇ around which flexible strips 12 pass, the upper ends of which are secured to arms 6 by clamping devices 13, 14, the lower ends of which strips are shown depending from the ends 6ᵇ of the arms 6, and connected with a suitable loop or the like 15 to which the weighing mechanism may be connected. The arms 6 are movably supported by means of one or more flexible strips 16 shown secured at their upper ends upon the fulcrum block by the clamping bar 17 and screws 18, the lower ends of said strips 16 being shown secured to the arms 6 by clamping bar 19 and screws 20, whereby arms 6 are movably supported by the flexible strips 16 to rock with respect to the fulcrum blocks on the corresponding rollers 8.

The parts so far described are similar to well known weighing mechanisms, and in themselves form no part of my present invention. With such devices, however, there is danger that foreign substances or particles, such as dust, chips, etc. may lodge between the curved bearing surface 10ª of the fulcrum block and the strip 16, which is liable to cause the required accurate suspension of arm 6 from the fulcrum block to be variable and thereby to vary or detract from the accuracy of the index member or pointer, because such foreign substance has the tendency to cause strip 16 to rise correspondingly on the fulcrum block, as the strip swings on the latter, thereby disarranging the relation of the associate arm 6 with respect to its normal position, having a resultant effect upon the index or pointer of producing inaccurate movement of the latter, at least with respect to the relationship between the latter in some point of its movement and such foreign substance. To obviate these objections I provide the bearing surface 10ª of the fulcrum block with recesses or grooves 10ᵇ beneath strip 16, which recesses are shown extending from edge 10ᶜ upwardly in parallel relation along the surface of the fulcrum block upon which the strip 16 bears. The upper ends of the recesses 10ᵇ are shown leading to a transversely disposed recess or groove 10ᵈ shown extending laterally beyond the side edges of strip 16. The outer or peripheral edges of the metal between the recesses or grooves 10ᵇ are shown made relatively sharp or pointed to reduce the surface for particles or foreign substances to rest upon, and serving to cut into or sever such particles or substances under the pressure of the strip 16 against the same. It will be thus understood that if undesired particles or foreign substances lodge upon the fulcrum block beneath the strip 16, they will either drop into the grooves or recess 10ᵇ, and thus not interfere with the proper bearing of strip 16 upon the fulcrum block, or will be cut away by the movement and pressure of the strip thereon, and such particles may fall away from the fulcrum block, and if they should tend to crowd under strip 16 at the upper ends of grooves or recess 10ᵇ they will be received in the transverse groove or recess 10ᵈ, and thus work along and escape through the ends of the latter at the sides of strip 16.

My improvements are of great advantage, since it has been ascertained in practical use of weighing machines of the class described, which are very delicate in their operation, that the lodging of particles or foreign substances between the fulcrum block and the flexible strips, has the effect to cause such variation in the movable arm 6, from which the index or pointer is operated, as to cause inaccurate operation of the index or pointer, and that by keeping such particles or foreign substances from lodging between the flexible strip and its surface that bears upon the fulcrum block the proper operation of the index or pointer is more accurately maintained.

Each fulcrum block or bar may be provided with one or more strips 16 and grooves or recesses 10ª, 10ᵇ, corresponding thereto. In the example of weighing machines illustrated two fulcrum blocks 10, two corresponding arms 6, and two strips 12, each connected with the loop 15, are shown, but it will be understood that the number of such parts may be used according to the character of the weighing mechanism. Cam 6ᶜ with the corresponding arm 6 moves outwardly under the influence of the article being weighed, and causes rack 5 through pinion 4 to rotate the index or pointer 3 correspondingly, and the outer portion 6ᵈ of the cam correspondingly moves arm 5ᶜ back to restore the pointer as arm 6 returns toward the normal position. The cam 6ᶜ must be very accurately shaped in order that the movement it imparts to the index or pointer will correspond accurately with the article being weighed, and the weight of arm 5ᶜ bearing upon cam 6ᶜ is a factor in the accurate indication of the weight of the article to such an extent that if arm 5ᶜ bears too heavily upon the cam 6ᶜ it acts as an undesired counterpoise upon arm 6, and likewise if arm 5ᶜ bears too lightly, in some positions, upon cam 6ᶜ, there is a reverse effect upon the weighted arm 6, in either event resulting in more or less inaccurate indication by the index or pointer of the weight of the article being weighed.

In order to enable the proper balancing of the rack-arm 5ᶜ and its resulting pressure upon cam 6ᶜ, I provide an adjustable weight or counterpoise connected with the rack and so located relative to the axis of rotation of the rack, that by proper adjustment of said counterpoise with respect to the arc of rotation of the rack, as in an arc concentric therewith, or in the same arc, the weight of arm 5ᶜ bearing upon cam 6ᶜ may be very accurately determined with the effect of retaining such adjustment of the counterpoise constant as required. To this end I have shown an arm 21 that is firmly connected with rack 5 and provided with a yoke 21ᵃ carrying a threaded rod or screw 22 upon which an interiorly threaded counterpoise or weight 23 is fitted for adjustment, a lock nut 24 on said screw serving to retain the counterpoise or weight 23 in set position. The screw or threaded rod 22 is shown supported horizontally above rack 5 and extending on opposite sides of the vertical plane passing through pivot 5ᵃ, so that counterpoise or weight 23 is adjustable laterally with respect to such plane. By the arrangement set forth, counterpoise or weight 23 may be adjusted to the right or left, respecting the vertical plane through pivot 5ᵃ, and thereby the weight or pressure of arm 5ᶜ upon or with respect to cam 6ᶜ may be very accurately determined, and whereby if in any position of arm 5ᶜ with respect to cam 6ᶜ, when the latter is moved by arm 6, it is found that the pressure or weight of arm 5ᶜ upon said cam is too great or too light, then by the proper adjustment of counterpoise or weight 23, to the right or left, such pressure or weight of arm 5ᶜ upon the cam may be rectified, thus increasing or decreasing the resultant pressure of said arm 5ᶜ upon arm 6 to cause the more accurate indicating by the index or pointer.

While I have illustrated my improvements in connection with a well known class or type of weighing mechanism, it will be understood that my invention is not limited for use with the particular details of construction of weighing mechanism set forth, and that changes may be made, within the scope of the appended claims, without departing from the spirit of my invention.

Having now described my invention what I claim is:—

1. A weighing mechanism comprising a fulcrum block, an arm, and a flexible strip connecting the fulcrum block with the arm, said fulcrum block being provided in its upper surface with a recess extending longitudinally of said block beneath said strip.

2. A weighing mechanism comprising a fulcrum block, an arm, and a flexible strip connecting the fulcrum block with the arm, said fulcrum block being provided in its upper surface with a recess extending longitudinally of said block beneath said strip and extending beyond the side edges of said strip.

3. A weighing mechanism comprising an arm, means to movably support the arm, an index, devices to actuate the index, an adjustable counterpoise connected with said devices, and a cam connected with said arm to actuate said devices, said counterpoise serving to regulate pressure of said devices upon said cam.

4. A weighing mechanism comprising an arm, means to movably support the arm, a cam connected with said arm, an index, a rack and pinion to operate the index, an arm connected with the rack and coöperative with said cam, and a counterpoise connected with said rack to regulate the pressure of said arm upon said cam.

5. A weighing mechanism comprising an arm, means to movably support the arm, a cam connected with said arm, an index, a rack and pinion to operate the index, an arm connected with the rack and coöperative with said cam, and a counterpoise connected with said rack to regulate the pressure of said arm upon said cam, said counterpoise being adjustably connected with the rack to move transversely with respect to a plane passing upwardly through the axis of the rack.

6. A weighing mechanism comprising an arm, means to movably support the arm, a cam connected with said arm, an index, a rack and pinion to operate the index, an arm connected with the rack and coöperative with said cam, said rack having an arm, a screw carried by said arm, and a counterpoise adjustable with respect to said screw.

7. A weighing mechanism comprising an arm, means to movably support the arm, a cam connected with said arm, an index, a rack and pinion to operate the index, an arm connected with the rack and coöperative with said cam, said rack having an arm, a yoke carried by said arm, a screw carried by said yoke, and a counterpoise mounted upon said screw.

Signed at New York city, in the county of New York, and State of New York, this 3rd day of May, A. D. 1912.

JOSEPH C. BARRETT.

Witnesses:
T. F. BOURNE,
MARIE F. WAINRIGHT.